US012036787B2

(12) United States Patent
Yoshioka et al.

(10) Patent No.: US 12,036,787 B2
(45) Date of Patent: Jul. 16, 2024

(54) IMAGE FORMING APPARATUS

(71) Applicant: FUJIFILM Business Innovation Corp., Tokyo (JP)

(72) Inventors: Tomoaki Yoshioka, Kanagawa (JP); Mitsuaki Kuroda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 211 days.

(21) Appl. No.: 17/592,793

(22) Filed: Feb. 4, 2022

(65) Prior Publication Data

US 2023/0067141 A1 Mar. 2, 2023

(30) Foreign Application Priority Data

Aug. 25, 2021 (JP) ................................ 2021-137595

(51) Int. Cl.
*B41J 11/04* (2006.01)
*B41J 11/00* (2006.01)

(52) U.S. Cl.
CPC .............. *B41J 11/04* (2013.01); *B41J 11/007* (2013.01)

(58) Field of Classification Search
CPC ................................ B41J 11/04; B41J 11/007
See application file for complete search history.

(56) References Cited

U.S. PATENT DOCUMENTS

2007/0229586 A1* 10/2007 Hirakawa ................ B41J 29/17 347/31

FOREIGN PATENT DOCUMENTS

JP 2002-108045 A 4/2002
JP 2012-220812 A 11/2012
WO 2021/014780 A1 1/2021
WO 2021/029119 A1 2/2021
WO WO-2021029119 A1 * 2/2021 ......... G03G 15/0131

OTHER PUBLICATIONS

Extended European Search Report dated Nov. 18, 2022, issued in European Application No. 22166236.4.

* cited by examiner

*Primary Examiner* — Jason S Uhlenhake
(74) *Attorney, Agent, or Firm* — Sughrue Mion, PLLC

(57) ABSTRACT

An image forming apparatus includes: a transfer cylinder that rotates; a rotating member that is coaxial with the transfer cylinder and rotates integrally with the transfer cylinder; a circulating member that is provided with a holding part that holds a front end portion of a recording medium, is suspended around the rotating member, and transports the recording medium by circulating as the rotating member rotates; and a transfer unit that has a transfer belt that sandwiches the recording medium transported by the circulating member at a nip position together with the transfer cylinder so that an image is transferred onto the recording medium. The nip position is located on one side relative to a center of the transfer unit in a horizontal direction when viewed from an axial direction of the rotating member, and a center of mass of the transfer unit is located on a nip position side relative to the center in the horizontal direction.

19 Claims, 5 Drawing Sheets

FIG. 5

| | EXAMPLE 1 | COMPARATIVE EXAMPLE 1 | COMPARATIVE EXAMPLE 2 |
|---|---|---|---|
| POSITION OF CENTER OF MASS 60G | 600m : 1000m | 800m : 800m | 1000m : 600m |
| OCCURRENCE OF BANDING | A | B | B |

IMAGE FORMING APPARATUS

CROSS-REFERENCE TO RELATED APPLICATIONS

This application is based on and claims priority under 35 USC 119 from Japanese Patent Application No. 2021-137595 filed Aug. 25, 2021.

BACKGROUND

(i) Technical Field

The present disclosure relates to an image forming apparatus.

(ii) Related Art

Japanese Unexamined Patent Application Publication No. 2012-220812 discloses a transfer device including a belt-shaped image carrier that carries an image, a drive roller around which the image carrier carrying the image is suspended and that moves the image carrier, a first tension roller around which the image carrier moved by the drive roller is suspended and gives tension to the image carrier, a first elastic support part that has a first elastic member generating the tension and supports one end of a rotary shaft of the first tension roller, a second elastic support part that has a second elastic member generating the tension and supports the other end of the rotary shaft of the first tension roller, a backup roller around which the image carrier suspended around the tension roller is suspended, a transfer roller that has a recessed part on a circumferential surface and forms a transfer nip by making contact with the image carrier suspended around the backup roller, and a second tension roller around which the image carrier suspended around the backup roller is suspended and that gives tension to the image carrier.

Japanese Unexamined Patent Application Publication No. 2002-108045 discloses an image forming apparatus including plural toner image formation units each including a toner image carrier and forming a toner image of a corresponding color on the toner image carrier, and an intermediate transfer belt onto which toner images of respective colors formed on the respective toner image carriers are transferred, wherein the toner images of the respective colors transferred onto the intermediate transfer belt are further transferred onto a recording medium, plural tensioning rollers that stretch the intermediate transfer belt into a shape having two or more planar parts that the toner image carriers provided in the toner image formation units face and a displacement unit that changes a tensioned state of the intermediate transfer belt by changing a position of at least one of the plural tensioning rollers are provided, and at least one of the toner image carriers and the intermediate transfer belt are provided so as to be separated away from each other and make contact with each other as the tensioned state of the intermediate transfer belt changes.

SUMMARY

An image forming apparatus may include a transfer cylinder that rotates, a rotating member such as sprockets provided coaxially with the transfer cylinder and rotating integrally with the transfer cylinder, a circulating member such as chains provided with a holding part holding a front end portion of a recording medium, suspended around the rotating member, and transporting a recording medium by circulating as the rotating member rotates, and a transfer unit having a transfer belt that sandwiches the recording medium transported by the circulating member at a nip position together with the transfer cylinder so that an image is transferred onto the recording medium.

In the image forming apparatus, vibration generated in the circulating member and the rotating member may undesirably propagate to the transfer unit having the transfer belt through the nip position and vibrate the transfer unit.

Aspects of non-limiting embodiments of the present disclosure relate to reducing vibration of a transfer unit as compared with a configuration in which a center of mass of the transfer unit is located on a side opposite to a nip position relative to a center of the transfer unit in a horizontal direction when viewed from an axial direction of the rotating member.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: a transfer cylinder that rotates; a rotating member that is coaxial with the transfer cylinder and rotates integrally with the transfer cylinder; a circulating member that is provided with a holding part that holds a front end portion of a recording medium, is suspended around the rotating member, and transports the recording medium by circulating as the rotating member rotates; and a transfer unit that has a transfer belt that sandwiches the recording medium transported by the circulating member at a nip position together with the transfer cylinder so that an image is transferred onto the recording medium, the nip position being located on one side relative to a center of the transfer unit in a horizontal direction when viewed from an axial direction of the rotating member, and a center of mass of the transfer unit being located on a nip position side relative to the center in the horizontal direction.

BRIEF DESCRIPTION OF THE DRAWINGS

Exemplary embodiments of the present disclosure will be described in detail based on the following figures, wherein:

FIG. 5 is a table illustrating results of evaluation of effects.

DETAILED DESCRIPTION

Exemplary embodiments of the present disclosure are described below with reference to the drawings.

First Exemplary Embodiment

Image Forming Apparatus 10

Figure 1:
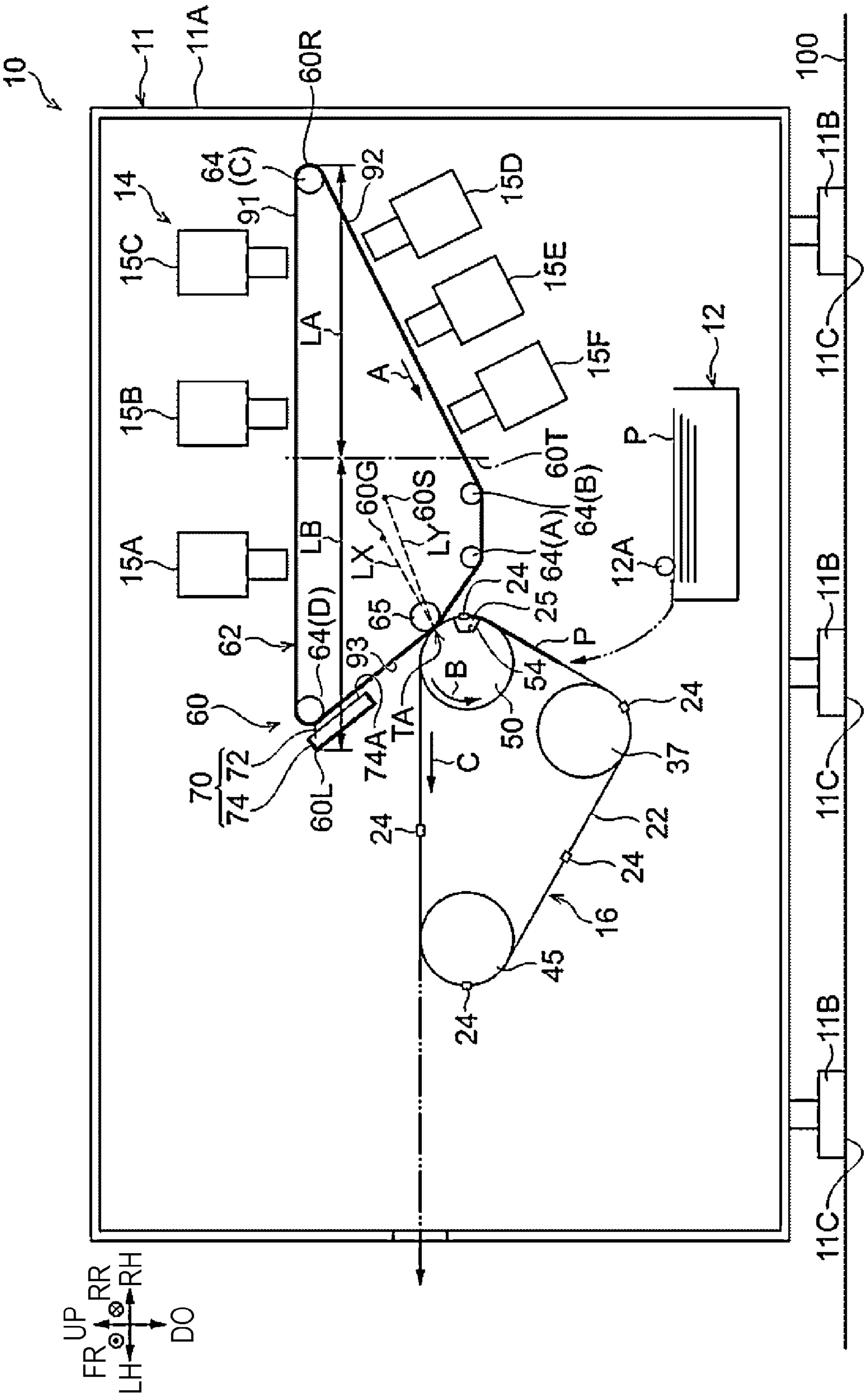
FIG. 1 is a schematic view illustrating a configuration of an image forming apparatus according to a first exemplary embodiment.

First, a configuration of an image forming apparatus 10 according to a first exemplary embodiment is described. FIG. 1 is a schematic view illustrating the configuration of the image forming apparatus 10 according to the present exemplary embodiment.

Note that arrow UP in the drawings indicates an upward direction (vertically upward direction) of the apparatus, and arrow DO indicates a downward direction (vertically downward direction) of the apparatus. Furthermore, arrow LH in the drawings indicates a leftward direction of the apparatus, and arrow RH indicates a rightward direction of the apparatus. Furthermore, arrow FR in the drawings indicates a frontward direction of the apparatus, and arrow RR indicates a rearward direction of the apparatus. These directions are directions set for convenience of description, and an apparatus configuration is not limited to these directions. Note that the wording "apparatus" may be omitted when the directions of the apparatus are mentioned. For example, the "upward direction of the apparatus" may be sometimes referred simply as an "upward direction".

In the following description, an "up-down direction" is sometimes used to refer to "both of the upward direction and the downward direction" or "either the upward direction or the downward direction". A "left-right direction" is sometimes used to refer to "both of the rightward direction and the leftward direction" or "either the rightward direction or the leftward direction". The "left-right direction" is also a lateral direction or a horizontal direction. A "front-rear direction" is sometimes used to refer to "both of the frontward direction and the rearward direction" or "either the frontward direction or the rearward direction". The front-rear direction corresponds to an axial direction of a sprocket 25, which will be described later, and is also a lateral direction or a horizontal direction. The up-down direction, the left-right direction, and the front-rear direction are directions crossing one another (specifically directions orthogonal to one another).

The symbol "○" having "x" therein in the drawings represents an arrow pointing from a near side toward a deeper side of the paper on which the drawings are drawn. Meanwhile, the symbol "○" having "•" therein in the drawings represents an arrow pointing from a deeper side toward a near side of the paper on which the drawings are drawn.

The image forming apparatus 10 illustrated in FIG. 1 is an inkjet image forming apparatus that forms an ink image (an example of an image) on a recording medium P. Specifically, the image forming apparatus 10 includes an image forming apparatus body 11, a medium storage part 12, a transport unit 16, and an image forming mechanism 14. The members (the image forming apparatus body 11, the medium storage part 12, the transport unit 16, and the image forming mechanism 14) of the image forming apparatus 10 are described.

Image Forming Apparatus Body 11

As illustrated in FIG. 1, the image forming apparatus body 11 is a part in which constituent parts of the image forming apparatus 10 are provided. Specifically, as illustrated in FIG. 1, the image forming apparatus body 11 has a housing 11A having a box shape and leg parts 11B provided on a lower end part of the housing 11A.

In the present exemplary embodiment, for example, the medium storage part 12, the image forming mechanism 14, and the transport unit 16 are provided in the housing 11A, as illustrated in FIG. 1. The leg parts 11B are provided on a bottom surface of the housing 11A. Bottom surfaces 11C of the leg parts 11B are in contact with a floor surface 100 on which the image forming apparatus 10 is provided. The housing 11A is supported by the leg parts 11B. Note that the image forming apparatus body 11 may be configured not to have the leg parts 11B.

Medium Storage Part 12

The medium storage part 12 is a part in which a recording medium P is stored in the image forming apparatus 10. A recording medium P stored in the medium storage part 12 is supplied to the transport unit 16. Specifically, a recording medium P stored in the medium storage part 12 is fed toward the transport unit 16 by a transport member 12A such as a transport roller.

The recording medium P is, for example, a sheet of paper. Note that the recording medium P is not limited to a sheet of paper, as long as the recording medium P is a medium on which an image can be formed. For example, the recording medium P may be a film.

Transport Unit 16

The transport unit 16 illustrated in FIG. 1 is a unit that transports a recording medium P. Note that the "unit" is a constituent unit constituting the image forming apparatus 10. That is, the "unit" is a constituent part handled as a single unit having a unity. In the present exemplary embodiment, the "unit" is a unit detachably attached to the image forming apparatus body 11. In other words, the "unit" is a unit integrally moved with respect to the image forming apparatus body 11.

Figure 2:
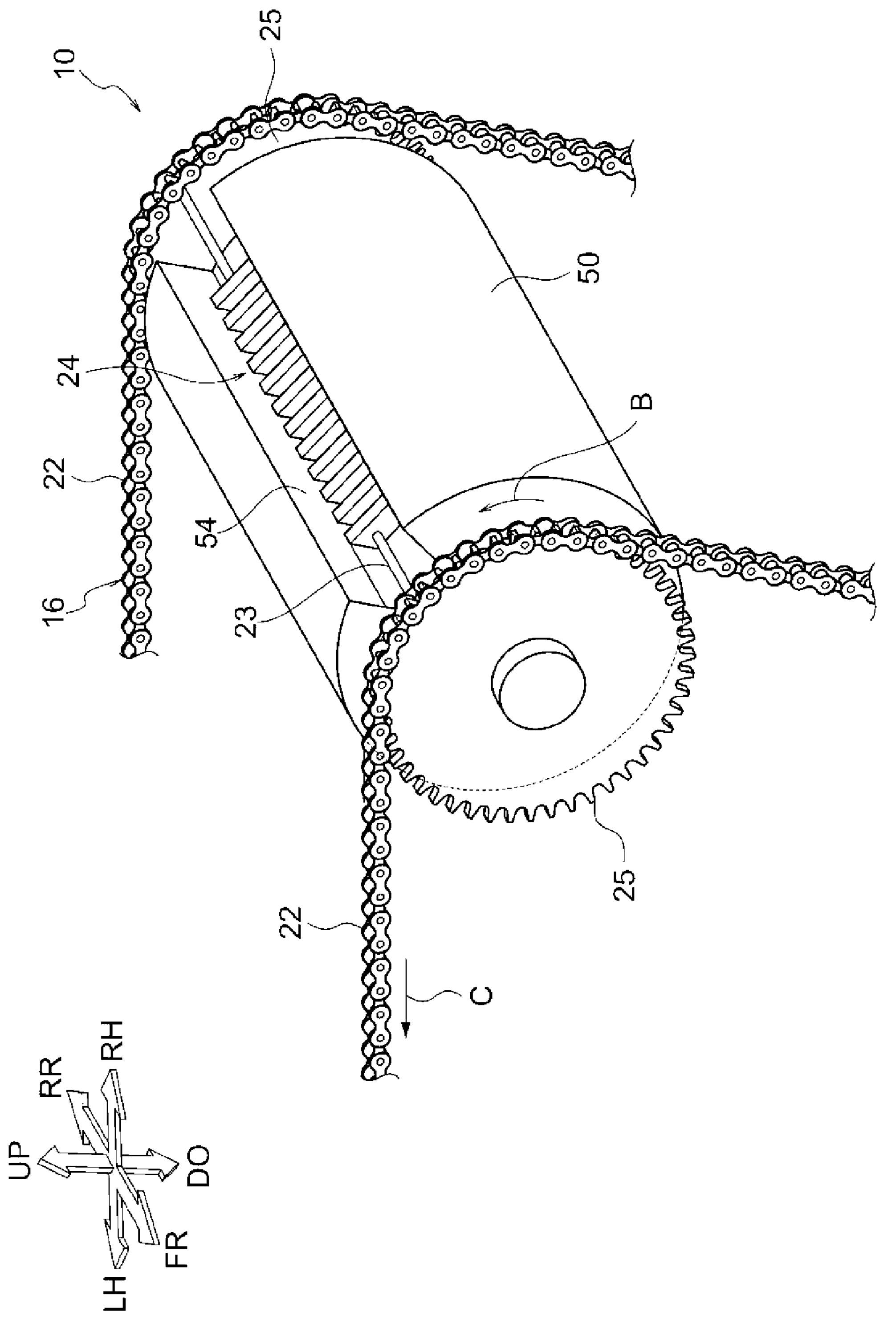
FIG. 2 is a perspective view illustrating configurations of chains, sprockets, and a transfer cylinder in the image forming apparatus according to the first exemplary embodiment.

Specifically, the transport unit 16 has a transfer cylinder 50, a pair of sprockets 25, a pair of chains 22, and grippers 24, as illustrated in FIGS. 1 and 2. Furthermore, the transport unit 16 has a pair of sprockets 37 and a pair of sprockets 45, as illustrated in FIG. 1. The pair of sprockets 25 are an example of a "rotating member". The pair of chains 22 are an example of a "circulating member". The grippers 24 are an example of a "holding part".

In FIG. 1, one of the pair of chains 22 is illustrated, and one of the pair of sprockets 25, one of the pair of sprockets 37, and one of the pair of sprockets 45 are illustrated. In FIG. 1, the sprockets 25, 37, and 45, the chains 22, the grippers 24, and others are illustrated in a simplified manner. In FIG. 2, the grippers 24 are illustrated in a simplified manner.

Transfer Cylinder 50

As illustrated in FIG. 2, the transfer cylinder 50 has a substantially cylindrical shape whose axial direction is the front-rear direction. In other words, the transfer cylinder 50 has a substantially circular shape in rearward view.

Note that the rearward view is a case where a target (the transfer cylinder 50 in this example) is viewed from a front side toward a rear side. That is, the rearward view is a case where the target is viewed toward a rear side, which is one side along a direction of a rotary axis of the pair of sprockets 25. Accordingly, the rearward view is an example of "when viewed in an axial direction of the rotating member".

As illustrated in FIGS. 1 and 2, the transfer cylinder 50 has a recessed part 54 on an outer circumferential surface thereof. In the present exemplary embodiment, a single recessed part 54 is provided in a part of the outer circumferential surface of the transfer cylinder 50 in a circumferential direction. This recessed part 54 is long along the axial direction of the transfer cylinder 50 and has a depth along a radial direction of the transfer cylinder 50. Specifically, the recessed part 54 is provided from one end to the other end of the transfer cylinder 50 in the axial direction. That is, the recessed part 54 is opened on the one end and the other end of the transfer cylinder 50 in the axial direction and passes through the transfer cylinder 50 in the axial direction.

Furthermore, as illustrated in FIG. 2, the recessed part 54 is a recessed part in which the grippers 24 are stored. Accordingly, the recessed part 54 is configured such that a depth thereof along the radial direction of the transfer cylinder 50 and a width thereof along the circumferential direction of the transfer cylinder 50 are larger than a size of the grippers 24. That is, the recessed part 54 according to the present exemplary embodiment is different from a microscopic recess formed on the outer circumferential surface of the transfer cylinder 50. Note that although a single recessed part 54 is provided in a part of the outer circumferential surface of the transfer cylinder 50 in the circumferential direction in the present exemplary embodiment, plural recessed parts 54 may be provided.

Pairs of Sprockets 25, 37, and 45 and Pair of Chains 22

As illustrated in FIG. 2, the pair of sprockets 25 are provided beside both ends of the transfer cylinder 50 in the axial direction. The pair of sprockets 25 are coaxial with the transfer cylinder 50 and rotates integrally with the transfer cylinder 50. The transfer cylinder 50 and the pair of sprockets 25 are driven to rotate by a driving part (not illustrated).

As illustrated in FIG. 1, the pair of sprockets 45 are disposed on a left side (i.e., on a downstream side in a transport direction) relative to the pair of sprockets 25. The pair of sprockets 45 are disposed so as to be spaced apart from each other in the front-rear direction.

The pair of sprockets 37 are disposed on a lower side relative to the pair of sprockets 25 and the pair of sprockets 45 and on a left side (i.e., on a pair of sprockets 45 side) relative to the pair of sprockets 25. The pair of sprockets 37 are disposed so as to be spaced apart from each other in the front-rear direction.

As illustrated in FIG. 1, the pair of chains 22 have an annular shape. As illustrated in FIG. 2, the pair of chains 22 are disposed so as to be spaced apart from each other in the front-rear direction. Each of chains 22 is suspended around a corresponding one of sprockets 25, a corresponding one of sprockets 37, and a corresponding one of sprockets 45. That is, each of chains 22 is engaged with a corresponding one of sprockets 25, a corresponding one of sprockets 37, and a corresponding one of sprockets 45.

The transfer cylinder 50 and the pair of sprockets 25 are driven to rotate integrally in a rotation direction B (a direction indicated by arrow B in FIGS. 1 and 2), and thereby the pairs of sprockets 37 and 45 rotate and the pair of chains 22 circulate in a circulation direction C (a direction indicated by arrow C in FIGS. 1 and 2). That is, the pair of chains 22 circulate as the pairs of sprockets 25, 37, and 45 rotate.

Grippers 24

Figure 3:
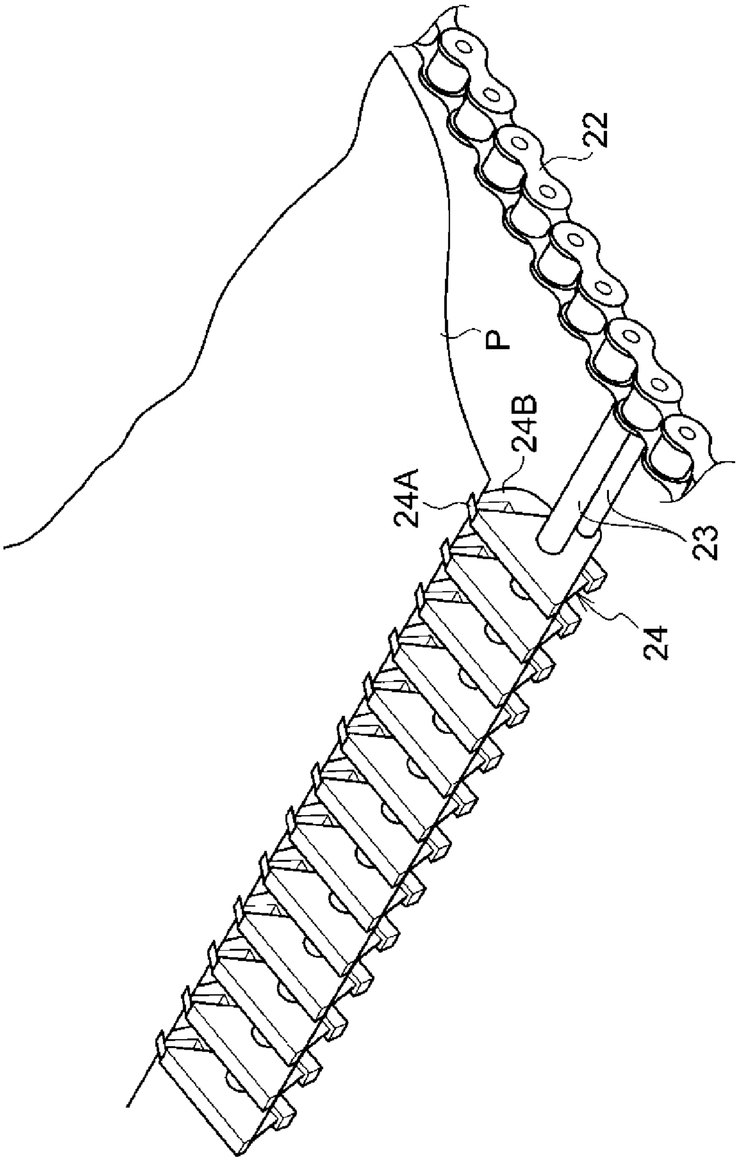
FIG. 3 is a perspective view illustrating a state where a recording medium is held by grippers of the image forming apparatus according to the first exemplary embodiment.

As illustrated in FIG. 3, the grippers 24 function as a holding part that holds a front end portion of a recording medium P. As illustrated in FIG. 2, the grippers 24 are attached to an attachment member 23 provided along the front-rear direction between the pair of chains 22. That is, the grippers 24 are provided on the chains 22 with the attachment member 23 interposed therebetween.

Plural attachment members 23 are disposed at predetermined intervals along the circulation direction C of the chains 22. One end and the other end of each of the attachment members 23 in a longitudinal direction are attached to the pair of chains 22, respectively.

As illustrated in FIG. 2, the grippers 24 are attached to each of the attachment members 23 at predetermined intervals along the front-rear direction. As illustrated in FIG. 3, each of the grippers 24 has a claw 24A and a claw rest 24B. Each of the grippers 24 is configured to hold a recording medium P by nipping a front end portion of the recording medium P between the claw 24A and the claw rest 24B. Note that each of the grippers 24 is, for example, configured such that the claw 24A is pressed against the claw rest 24B by a spring or the like and the claw 24A is opened and closed relative to the claw rest 24B by action of a cam or the like.

Although the grippers 24, which are an example of a holding part, hold a front end portion of a recording medium P on a downstream side in the transport direction in the present exemplary embodiment, this is not restrictive. The holding part may be any holding part that holds a front end portion of a recording medium P and may be, for example, a holding part that holds a front end portion of a recording medium P from both sides of the recording medium P.

In the transport unit 16, a front end portion of a recording medium P supplied from the medium storage part 12 in which recording media P are stored is held by the grippers 24 as illustrated in FIG. 3. The chains 22 circulate in the circulation direction C in a state where the grippers 24 hold the front end portion of the recording medium P, and thereby the recording medium P is transported to pass a transfer position TA, which will be described later. The grippers 24 pass the transfer position TA (i.e., between the transfer cylinder 50 and an opposed roller 65), which will be described later, while being stored in the recessed part 54 of the transfer cylinder 50.

Image Forming Mechanism 14

The image forming mechanism 14 illustrated in FIG. 1 has a function of forming an image on the recording medium P. Specifically, the image forming mechanism 14 forms an image on a recording medium P transported by the transport unit 16 by using ink. More specifically, as illustrated in FIG. 1, the image forming mechanism 14 has ejection units 15A, 15B, 15C, 15D, 15E, and 15F (hereinafter referred to as 15A to 15F) and a transfer unit 60 having a transfer belt 62.

Ejection Units 15A to 15F

Each of the ejection units 15A to 15F has a function of forming an image to be transferred from the transfer belt 62 onto a recording medium P. Specifically, the ejection units 15A to 15F are units that form images of predetermined colors on an outer circumferential surface of the transfer belt 62 by ejecting ink droplets of the predetermined colors toward the transfer belt 62. The predetermined colors include yellow (Y), magenta (M), cyan (C), and black (K). Note that the ejection units 15A to 15F are an example of an "image forming part".

Transfer Unit 60

As described above, the transfer unit 60 is a unit that has the transfer belt 62 that transfers an image onto a recording medium P. Specifically, the transfer unit 60 has the transfer belt 62, the opposed roller 65, plural support rollers 64, and a cleaning part 70.

Note that the transfer unit 60 further has a support (not illustrated) that supports the members (specifically, the transfer belt 62, the opposed roller 65, the plural support rollers 64, the cleaning part 70, and other members) of the transfer unit 60. The support has a support frame (not illustrated) disposed on a front side and a rear side relative to the transfer belt 62.

Transfer Belt 62, Opposed Roller 65, and Plural Support Rollers 64

The transfer belt 62 has an annular shape (specifically, an endless shape), and is suspended around the opposed roller 65 and the plural support rollers 64 and is thereby supported by the opposed roller 65 and the plural support rollers 64.

The opposed roller 65 is disposed so as to face the transfer cylinder 50 with the transfer belt 62 interposed therebetween. Specifically, the opposed roller 65 is disposed on an upper right side relative to the transfer cylinder 50. The opposed roller 65 is pressed against the outer circumferential surface of the transfer cylinder 50 with the transfer belt 62 interposed therebetween, for example, by elastic force of an elastic member (not illustrated).

In the present exemplary embodiment, a position where the opposed roller 65 faces the transfer cylinder 50 is the transfer position TA where an image is transferred onto the recording medium P. The transfer position TA is an example of a "nip position". The transfer position TA may also be referred to as an image formation position since an image is transferred and formed on a recording medium P at the transfer position TA.

Specifically, four support rollers 64 are provided on an inner circumferential side of the transfer belt 62, as indicated by reference signs (A), (B), (C), and (D) in FIG. 1. The support rollers 64(A) and 64(B) are disposed side by side along the left-right direction on a lower side and a right side relative to the transfer position TA. The support roller 64(C) is disposed on an upper side and a right side relative to the transfer position TA. The support roller 64(D) is disposed on an upper side and a left side relative to the transfer position TA. The support rollers 64(C) and 64(D) are disposed side by side along the left-right direction.

The transfer belt 62 is suspended around the opposed roller 65 and the four support rollers 64 and thereby forms a substantially pentagonal shape formed by five faces including a first face 91, a second face 92, and a third face 93 in rearward view.

The first face 91 of the transfer belt 62 is a face that faces an upper side between the support roller 64(C) and the support roller 64(D). The second face 92 of the transfer belt 62 is a face that faces a lower right side between the support roller 64(B) and the support roller 64(C). The third face 93 of the transfer belt 62 is a face that faces a lower left side between the opposed roller 65 and the support roller 64(D).

The ejection units 15A, 15B, and 15C face the first face 91 of the transfer belt 62 and form images by ejecting ink droplets toward the first face 91 of the transfer belt 62. The ejection units 15D, 15E, and 15F face the second face 92 of the transfer belt 62 and form images by ejecting ink droplets toward the second face 92 of the transfer belt 62.

Of the four support rollers 64, the support roller 64(D) is a driving roller that transmits driving force to the transfer belt 62. The support roller 64(D) is driven to rotate by a driving motor (not illustrated). The support roller 64(D) is a solid support roller. Meanwhile, the support rollers 64(A), 64(B), and 64(C) are hollow support rollers and driven rollers. Accordingly, mass of the support roller 64(D) is larger than mass of each of the support rollers 64(A), 64(B), and 64(C). Note that a hollow support roller is a support roller that has a hollow space therein, and a solid support roller is a support roller that has no hollow space inside a shaft thereof. Each of the support rollers 64 is, for example, a roller having a shaft and a rubber layer provided on an outer circumference of the shaft.

When the support roller 64(D) is driven to rotate, the transfer belt 62 circulates in the circulation direction A (the direction indicated by arrow A in FIG. 1). The circulating transfer belt 62 transfers images formed on the outer circumferential surface thereof onto a recording medium P transported by the transport unit 16 by sandwiching the recording medium P together with the transfer cylinder 50 at the transfer position TA. In this way, an image is formed on the recording medium P.

Cleaning Part 70

The cleaning part 70 has a function of cleaning the transfer belt 62. Specifically, the cleaning part 70 has a function of removing a foreign substance attached on the transfer belt 62. Examples of the foreign substance include paper powder generated from a sheet of paper, which is an example of a recording medium P, and ink.

As illustrated in FIG. 1, the cleaning part 70 is disposed so as to face the third face 93 of the transfer belt 62. The cleaning part 70 has a blade 72 and a housing 74 in which the blade 72 is disposed.

The blade 72 has a function as an example of a contact part that removes a foreign substance from the transfer belt 62 by making contact with the transfer belt 62.

Specifically, the blade 72 makes contact with a portion of the transfer belt 62 that is suspended around the support roller 64(D). That is, the blade 72 is disposed so as to face the support roller 64(D) with the transfer belt 62 interposed therebetween. In the present exemplary embodiment, the blade 72 removes a foreign substance from the transfer belt 62 by making contact with the portion of the transfer belt 62 that is suspended around the support roller 64(D) and scraping away the foreign substance attached on the transfer belt 62.

The housing 74 has an opening 74A on a side facing the third face 93 of the transfer belt 62 (i.e., on a side facing the support roller 64(D)), and a foreign substance removed by the blade 72 is stored in the housing 74 through the opening 74A.

Note that an example of the contact part that makes contact with the transfer belt 62 is not limited to the blade 72. The contact part may be any part that can remove a foreign substance from the transfer belt 62 and may be, for example, a brush. The blade 72, which is an example of the contact part, may be configured to make contact with a portion of the transfer belt 62 that is not suspended around the support roller 64. In this case, a member such as a roller is disposed so as to face the blade 72 with the transfer belt 62 interposed therebetween.

Positional Relationship among Parts of Transfer Unit 60

In the transfer unit 60, the transfer position TA is located on a left side relative to a center 60T of the transfer unit 60 in the left-right direction in rearward view. The center 60T is a midpoint between a right end 60R of the transfer unit 60 and a left end 60L of the transfer unit 60 in the left-right direction. Accordingly, a length (a length LA in FIG. 1) from the center 60T to the right end 60R along the left-right direction and a length (a length LB in FIG. 1) from the center 60T to the left end 60L along the left-right direction are equal.

The expression "located on a left side relative to a center 60T" means being located on a left side on the basis of the center 60T, and a position in the up-down direction is not limited. Note that the left-right direction is an example of a "horizontal direction". The left side is an example of "one side".

In the transfer unit 60, the cleaning part 70 is located on a transfer position TA side relative to the center 60T in the left-right direction in rearward view. In the transfer unit 60, the support roller 64(D), which is a driving roller, is located on a transfer position TA side relative to the center 60T in the left-right direction in rearward view. The expression "located on a transfer position TA side relative to the center 60T" means being located on a transfer position TA side (i.e., on a left side) on the basis of the center 60T, and a position in the up-down direction is not limited.

A center of mass 60G of the transfer unit 60 is located on a transfer position TA side relative to the center 60T in the left-right direction in rearward view. The center of mass 60G of the transfer unit 60 is a point where total force of gravity working on the parts of the transfer unit 60 acts.

In the present exemplary embodiment, it can also be said that the center of mass 60G of the transfer unit 60 is located on a transfer position TA side relative to a geometric center 60S of the transfer unit 60 in rearward view. The geometric center 60S is a point at a position of an arithmetic average of all points belonging to an external shape of the transfer unit 60 in rearward view. Note that assume that the transfer unit 60 has a uniform density, the center of mass 60G and the geometric center 60S match each other. In other words, the geometric center 60S is a center of mass 60G obtained assuming that the transfer unit 60 has a uniform density.

Furthermore, the state where "the center of mass 60G of the transfer unit 60 is located on a transfer position TA side relative to a geometric center 60S of the transfer unit 60" is, in other words, a state where the center of mass 60G is located so that a distance (a distance indicated by broken line LX in FIG. 1) between the center of mass 60G and the transfer position TA becomes shorter than a distance (a distance indicated by broken line LY in FIG. 1) between the geometric center 60S and the transfer position TA. Note that such a distance from the transfer position TA is a distance from a center of the transfer position TA in the circulation direction in a case where the transfer position TA has a width in the circulation direction of the transfer belt 62.

Mass of Each Part of Image Forming Apparatus 10

Mass of the transport unit 16 including the transfer cylinder 50, the pairs of sprockets 25, 37, and 45, the pair of chains 22, and the grippers 24 is two times as large as mass of the transfer unit 60 or larger. Specifically, the mass of the transfer unit 60 is 300 kg, and the mass of the transport unit 16 is, for example, 600 kg.

Furthermore, mass of each of the ejection units 15A to 15F is 100 kg or larger. Specifically, the mass of each of the ejection units 15A to 15F is within a range of 120 kg or larger and 130 kg or smaller. The mass of each of the ejection units 15A to 15F includes mass of ink stored in each of the ejection units 15A to 15F.

Operation According to First Exemplary Embodiment

Next, operation according to the first exemplary embodiment is described.

In the image forming apparatus 10, a front end portion of a recording medium P fed from the medium storage part 12 in which recording media P are stored is held by the grippers 24, as illustrated in FIG. 3. In the state where the grippers 24 are holding the front end portion of the recording medium P, the chains 22 circulate in the circulation direction C. This causes the recording medium P to be transported and pass the transfer position TA. The grippers 24 pass the position between the transfer cylinder 50 and the opposed roller 65 while being stored in the recessed part 54 of the transfer cylinder 50.

Then, the transfer belt 62 transfers an image formed on an outer circumferential surface thereof onto the recording medium P by sandwiching the recording medium P together with the transfer cylinder 50 at the transfer position TA. In this way, an image is formed on the recording medium P.

In the image forming apparatus 10, vibration generated in members such as the chains 22 and the sprockets 25 during transport of the recording medium P may undesirably propagate from the transfer cylinder 50 to the transfer unit 60 having the transfer belt 62 through the transfer position TA and vibrate the transfer unit 60.

In particular, since the opposed roller 65 is pressed against the outer circumferential surface of the transfer cylinder 50 with the transfer belt 62 interposed therebetween in the present exemplary embodiment, vibration is likely to be generated at the transfer position TA due to a step of the recessed part 54 when the recessed part 54 of the transfer cylinder 50 passes the transfer position TA (hereinafter referred to as a cause A).

Furthermore, since the mass of the transport unit 16 is two times as large as the mass of the transfer unit 60 or larger in the present exemplary embodiment, the transfer unit 60 is likely to vibrate due to the vibration generated in the transport unit 16 (hereinafter referred to as a cause B).

Furthermore, since the mass of each of the ejection units 15A to 15F is 100 kg or larger in the present exemplary embodiment, the image forming apparatus 10 becomes large in size, and therefore the transfer unit 60 is likely to be vibrated (hereinafter referred to as a cause C). When the transfer unit 60 is vibrated, an image defect such as banding occurs in an image transferred from the transfer belt 62 onto the recording medium P. Note that the banding is an image defect that appears as deep and pale stripes.

In the present exemplary embodiment, the center of mass 60G of the transfer unit 60 is located on a transfer position TA side relative to the center 60T in the left-right direction in rearward view.

Accordingly, in a case where vibration propagates from the transfer cylinder 50 to the transfer unit 60 having the transfer belt 62 through the transfer position TA, the transfer unit 60 is less likely to be vibrated than in a configuration (hereinafter referred to as a "configuration A") where the center of mass 60G of the transfer unit 60 is located on a side opposite to the transfer position TA side relative to the center 60T in the left-right direction in rearward view.

As a result, according to the present exemplary embodiment, the vibration of the transfer belt 62 is reduced and occurrence of an image defect of an image formed on a recording medium P is reduced as compared with the configuration A although the configuration in which the transfer unit 60 is likely to be vibrated due to the causes A, B, and C is employed.

Furthermore, in the present exemplary embodiment, it can also be said that the center of mass 60G of the transfer unit 60 is located on a transfer position TA side relative to the geometric center 60S of the transfer unit 60 in rearward view.

Accordingly, even in a case where vibration propagates from the transfer cylinder 50 to the transfer unit 60 having the transfer belt 62 through the transfer position TA, the transfer unit 60 is less likely to be vibrated than in a configuration (hereinafter referred to as a configuration B) in which the center of mass 60G of the transfer unit 60 is located on a side opposite to the transfer position TA side relative to the geometric center 60S of the transfer unit 60 in rearward view.

As a result, according to the present exemplary embodiment, the vibration of the transfer belt 62 is reduced and occurrence of an image defect of an image formed on a recording medium P is reduced as compared with the configuration B although the configuration in which the transfer unit 60 is likely to be vibrated due to the causes A, B, and C is employed.

Furthermore, in the present exemplary embodiment, the cleaning part 70 is located on a transfer position TA side relative to the center 60T in the left-right direction in rearward view.

Accordingly, the center of mass 60G of the transfer unit 60 is more easily located on a transfer position TA side relative to the center 60T in the left-right direction in rearward view than in a configuration in which the cleaning part 70 is located on a side opposite to the transfer position TA side relative to the center 60T in the left-right direction in rearward view.

Furthermore, in the present exemplary embodiment, the solid support roller 64(D) is located on a transfer position TA side relative to the center 60T in the left-right direction in rearward view.

Accordingly, the center of mass 60G of the transfer unit 60 is more easily located on a transfer position TA side relative to the center 60T in the left-right direction in rearward view than in a configuration in which the solid support roller 64(D) is located on a side opposite to the transfer position TA side relative to the center 60T in the left-right direction in rearward view.

Furthermore, in the present exemplary embodiment, the solid support roller 64(D) is a driving roller that transmits driving force to the transfer belt 62. Accordingly, warping deformation of the support roller 64(D) is suppressed while locating the center of mass 60G of the transfer unit 60 on a transfer position TA side relative to the center 60T in the left-right direction in rearward view than in a configuration in which a hollow support roller is a driving roller.

Second Exemplary Embodiment

Image Forming Apparatus 200

Figure 4:
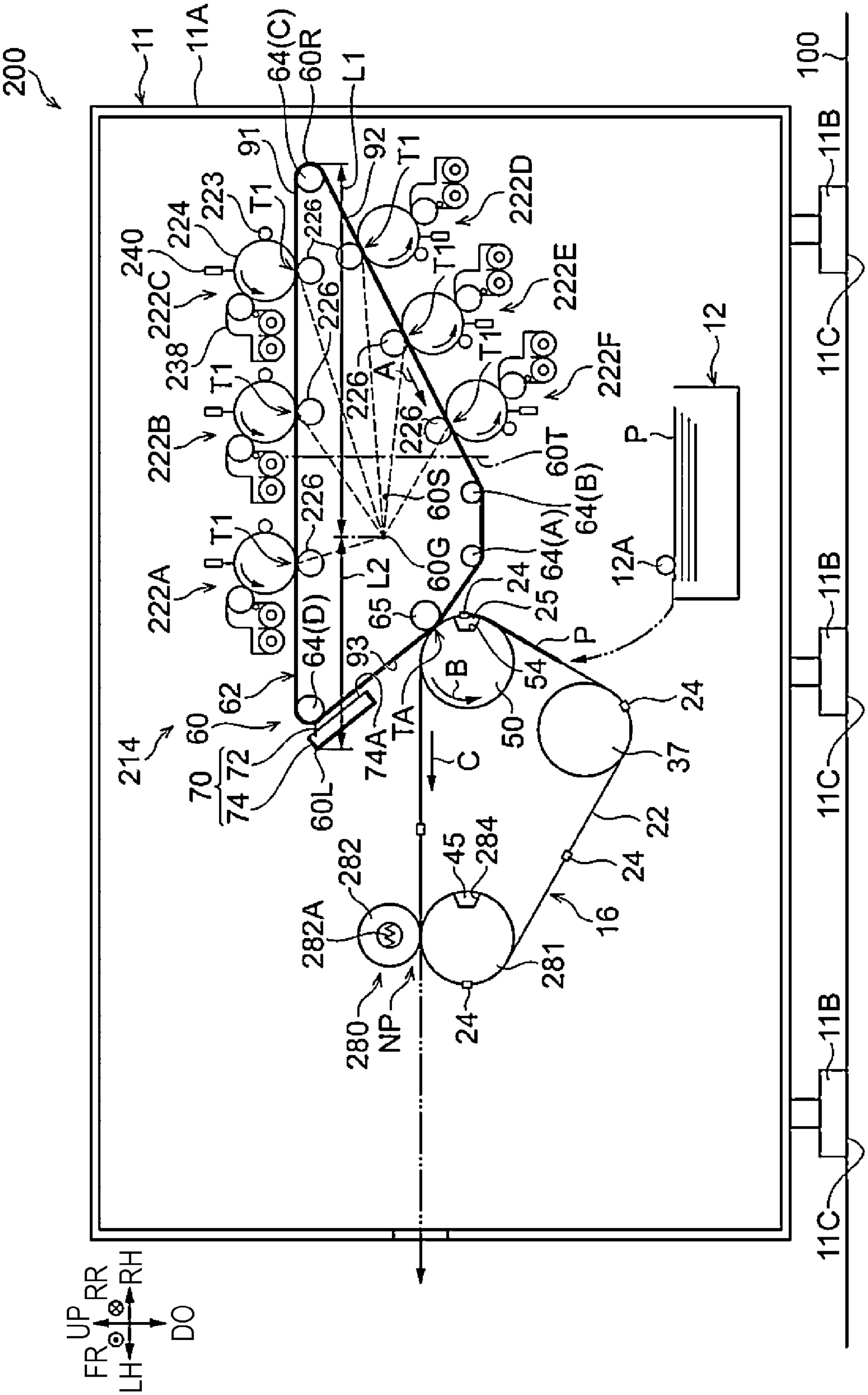
FIG. 4 is a schematic view illustrating a configuration of an image forming apparatus according to a second exemplary embodiment.

Although the image forming apparatus 10 is an inkjet image forming apparatus that forms an image on a recording medium P by using ink in the first exemplary embodiment, the image forming apparatus is not limited to this. The image forming apparatus may be any apparatus that forms an image and may be, for example, an electrophotographic image forming apparatus. In the second exemplary embodiment, an electrophotographic image forming apparatus 200 is described. FIG. 4 is a schematic view illustrating a configuration of the image forming apparatus 200 according to the present exemplary embodiment. Note that parts having identical functions to those in the first exemplary embodiment are given identical reference signs, and description thereof is omitted as appropriate.

Image Forming Mechanism 214

The image forming apparatus 200 has an image forming mechanism 214 instead of the image forming mechanism 14. The image forming mechanism 214 has a function of forming a toner image (an example of an image) on a recording medium P according to an electrophotographic system. More specifically, as illustrated in FIG. 4, the image forming mechanism 214 has toner image forming units 222A, 222B, 222C, 222D, 222E, and 222F (hereinafter referred to as 222A to 222F) that form toner images and a transfer unit 60 having a transfer belt 62.

Toner Image Forming Units 222A to 222F

Each of the toner image forming units 222A to 222F illustrated in FIG. 4 has a function of forming an image to be transferred from the transfer belt 62 onto a recording medium P. Specifically, the toner image forming units 222A to 222F are units that form images of predetermined colors by using toner of the predetermined colors. The predetermined colors include yellow (Y), magenta (M), cyan (C), and black (K). Note that the toner image forming units 222A to 222F are an example of an "image forming part".

In the present exemplary embodiment, the toner image forming units 222A to 222F have similar configurations except for used toner, and therefore parts of the toner image forming unit 222C as a representative of the toner image forming units 222A to 222F are given reference signs in FIG. 4.

Specifically, each of the toner image forming units 222A to 222F has a photoreceptor 224 that rotates in one direction (e.g., a counterclockwise direction in FIG. 4). Furthermore, each of the toner image forming units 222A to 222F has a charging device 223, an exposure device 240, and a developing device 238.

In each of the toner image forming units 222A to 222F, the charging device 223 charges the photoreceptor 224. Furthermore, the exposure device 240 forms an electrostatic latent image on the photoreceptor 224 by exposing the photoreceptor 224 charged by the charging device 223 to light. Furthermore, the developing device 238 forms a toner image by developing the electrostatic latent image formed on the photoreceptor 224 by the exposure device 240.

Note that each of the toner image forming units 222A to 222F further has a support (not illustrated) that supports members (specifically, the photoreceptor 224, the charging device 223, the exposure device 240, the developing device 238, and others) of each of the toner image forming units 222A to 222F. The support has a support frame (not illustrated) disposed on a front side and a rear side relative to the photoreceptor 224. The toner image forming units 222A to 222F may be any units that have at least the photoreceptor 224.

In the present exemplary embodiment, the toner image forming units 222A, 222B, and 222C face a first face 91 of the transfer belt 62, and the photoreceptors 224 of the toner image forming units 222A, 222B, and 222C are in contact with the first face 91 of the transfer belt 62. Furthermore, the toner image forming units 222D, 222E, and 222F face a second face 92 of the transfer belt 62, and the photoreceptors 224 of the toner image forming units 222D, 222E, and 222F are in contact with the second face 92 of the transfer belt 62.

Mass of each of the toner image forming units 222A to 222F is 100 kg or larger. Specifically, the mass of each of the toner image forming units 222A to 222F is within a range of 120 kg or larger and 130 kg or smaller.

Transfer Unit 60

The transfer unit 60 illustrated in FIG. 4 has a function of transferring toner images formed by the toner image forming units 222A to 222F onto a recording medium P. Specifically, the transfer unit 60 first-transfers toner images on the photoreceptors 224 of respective colors onto the transfer belt 62 serving as an intermediate transfer body and then second-transfers the toner images onto a recording medium P. As illustrated in FIG. 4, the transfer unit 60 has first transfer rollers 226 in addition to the transfer belt 62, an opposed roller 65, plural support rollers 64, and a cleaning part 70.

Each of the first transfer rollers 226 is a roller that transfers a toner image on the photoreceptor 224 of each of the toner image forming units 222A to 222F onto the transfer belt 62 at a first transfer position T1 between the photoreceptor 224 and the first transfer roller 226. Specifically, each of the first transfer rollers 226 sandwiches the transfer belt 62 together with the photoreceptor 224 at the first transfer position T1.

In the present exemplary embodiment, a first transfer electric field is applied between the first transfer roller 226 and the photoreceptor 224, and thereby a toner image formed on the photoreceptor 224 is transferred onto the transfer belt 62 at the first transfer position T1. Furthermore, a second transfer electric field is applied between the opposed roller 65 and the transfer cylinder 50, and thereby the toner image transferred onto the transfer belt 62 is transferred onto a recording medium P held between the transfer belt 62 and the transfer cylinder 50 at a transfer position TA.

Fixation Device 280

The image forming apparatus 200 further includes a fixation device 280 that fixes, on a recording medium P, a toner image transferred onto the recording medium P. As illustrated in FIG. 4, the fixation device 280 has a pressing roller 281 and a heating roller 282.

In the present exemplary embodiment, a pair of sprockets 45 are provided beside both ends of the pressing roller 281 in an axial direction, respectively. The pair of sprockets 45 are coaxial with the pressing roller 281 and rotates integrally with the pressing roller 281. Furthermore, the pressing roller 281 has, on an outer circumference thereof, a recessed part 284 in which grippers 24 and an attachment member 23 are stored.

In the fixation device 280, the heating roller 282 is disposed on an upper side relative to the pressing roller 281. The heating roller 282 has a heating source 282A such as a halogen lamp therein.

In the fixation device 280, a recording medium P is heated and pressed while being transported between the heating roller 282 and the pressing roller 281, and thereby a toner image transferred onto the recording medium P is fixed on the recording medium P.

In the image forming apparatus 200, chains 22 circulate in a circulation direction C while the grippers 24 are holding a front end portion of a recording medium P, and thereby the transport unit 16 causes the recording medium P to pass the transfer position TA and a fixation position NP between the pressing roller 281 and the heating roller 282. Then, toner images first-transferred onto the transfer belt 62 so as to be superimposed on one another at the first transfer positions T1 of the toner image forming units 222A to 222F are second-transferred onto the recording medium P at the transfer position TA. The toner images second-transferred onto the recording medium P are fixed on the recording medium P at the fixation position NP.

The transfer unit 60 according to the present exemplary embodiment has a similar configuration to the transfer unit 60 according to the first exemplary embodiment except for that the first transfer rollers 226 are provided, and the present exemplary embodiment achieves similar operation to the first exemplary embodiment.

In the transfer unit 60 according to the present exemplary embodiment, a center of mass 60G is located closer to the toner image forming unit 222A disposed on an immediately downstream side relative to the transfer position TA in the circulation direction A of the transfer belt 62 among the toner image forming units 222A to 222F than to the toner image forming units 222B, 222C, 222D, 222E, and 222F disposed on a downstream side of the toner image forming unit 222A in the circulation direction A.

The expression "disposed on an immediately downstream side relative to the transfer position TA in the circulation direction A of the transfer belt 62" means being disposed at a position that is on a downstream side relative to the transfer position TA in the circulation direction A and is closest to the transfer position TA on a downstream side of the circulation direction A.

The expression "located closer" means being located at a position where a distance (a distance indicated by the broken arrow in FIG. 4) between the first transfer position T1 (i.e., a contact position between the photoreceptor 224 and the transfer belt 62) and the center of mass 60G is short. Note that the "distance between the first transfer position T1 and the center of mass 60G" is a distance from a center of the first transfer position T1 in the circulation direction in a case where the first transfer position T1 has a width in the circulation direction of the transfer belt 62.

In the transfer unit 60, when viewed from the transfer position TA, a downstream side of the transfer belt 62 relative to the transfer position TA in the circulation direction is a pulled side, and an upstream side of the transfer belt 62 relative to the transfer position TA in the circulation direction is a pulling side. Accordingly, the transfer belt 62 is given tension on a downstream side relative to the transfer position TA in the circulation direction than on an upstream side relative to the transfer position TA in the circulation direction, and vibration that has propagated from the transfer cylinder 50 to the transfer belt 62 through the transfer position TA easily propagates to the downstream side relative to the transfer position TA in the circulation direction. As a result, the toner image forming unit 222A is more likely to be vibrated than the toner image forming units 222B, 222C, 222D, 222E, and 222F.

In the present exemplary embodiment, the center of mass 60G is located closer to the toner image forming unit 222A among the toner image forming units 222A to 222F than to the toner image forming units 222B, 222C, 222D, 222E, and 222F, as described above.

Accordingly, the vibration of the toner image forming unit 222A is reduced as compared with a configuration in which the center of mass 60G is located closer to any one of the toner image forming units 222B, 222C, 222D, 222E, and 222F than the toner image forming unit 222A among the toner image forming units 222A to 222F.

Evaluation

In evaluation, an image was formed on a recording medium P while changing a position of the center of mass 60G of the transfer unit 60 in the left-right direction of the transfer unit 60, and occurrence of banding in the image was evaluated.

In the evaluation, a half-tone image (image density 20%) of a single color was formed on the recording medium P by using the toner image forming units 222A to 222F, and occurrence of banding was visually checked.

Evaluation Criteria

A: occurrence of banding cannot be confirmed

B: occurrence of banding can be confirmed

Example 1

The position of the center of mass 60G was set to a position whose distance (distance L1 in FIG. 4) from a right end 60R of the transfer unit 60 in the left-right direction is 1000 mm and whose distance (distance L2 in FIG. 4) from a left end 60L of the transfer unit 60 in the left-right direction is 600 mm.

In Example 1, the center of mass 60G of the transfer unit 60 is located on a transfer position TA side relative to a center 60T in the left-right direction in rearward view. Furthermore, in Example 1, the center of mass 60G of the transfer unit 60 is located on a transfer position TA side relative to a geometric center 60S of the transfer unit 60 in rearward view.

Comparative Example 1

The position of the center of mass 60G was set to a position whose distance (distance L1 in FIG. 4) from the right end 60R of the transfer unit 60 in the left-right direction is 800 mm and whose distance (distance L2 in FIG. 4) from the left end 60L of the transfer unit 60 in the left-right direction is 800 mm.

In Comparative Example 1, the center of mass 60G was set at a position that matches the center 60T in the left-right direction in rearward view. Furthermore, in Comparative Example 1, the center of mass 60G of the transfer unit 60 was set at a position on a side opposite to the transfer position TA side relative to the geometric center 60S of the transfer unit 60.

Comparative Example 2

The position of the center of mass 60G was set to a position whose distance (distance L1 in FIG. 4) from the right end 60R of the transfer unit 60 in the left-right direction is 600 mm and whose distance (distance L2 in FIG. 4) from the left end 60L of the transfer unit 60 in the left-right direction is 1000 mm.

In Comparative Example 2, the center of mass 60G was set at a position on a side opposite to the transfer position TA side relative to the center 60T in the left-right direction in rearward view. Furthermore, in Comparative Example 2, the center of mass 60G of the transfer unit 60 was set at a position on a side opposite to the transfer position TA side relative to the geometric center 60S of the transfer unit 60 in rearward view.

Evaluation Results

As illustrated in FIG. 5, occurrence of banding was confirmed in Comparative Examples 1 and 2. Meanwhile, occurrence of banding was not confirmed in Example 1. The banding is considered to occur due to vibration of the transfer unit 60. Therefore, the results illustrated in FIG. 5 indicate that vibration of the transfer unit 60 was reduced in Example 1 as compared with Comparative Examples 1 and 2.

Modifications

In the first and second exemplary embodiments, the configuration (hereinafter referred to as a first configuration) in which the center of mass 60G of the transfer unit 60 is located on a transfer position TA side relative to the center 60T in the left-right direction in rearward view and the configuration (hereinafter referred to as a second configuration) in which the center of mass 60G of the transfer unit 60 is located on a transfer position TA side relative to the geometric center 60S of the transfer unit 60 in rearward view are employed as described above, but this is not restrictive. The transfer unit 60 need just have at least one of the first and second configurations.

Although the cleaning part 70 is located on a transfer position TA side relative to the center 60T in the left-right direction in rearward view in the first and second exemplary embodiments, this is not restrictive. For example, the cleaning part 70 may be located on a side opposite to the transfer position TA side relative to the center 60T in the left-right direction in rearward view.

Although the solid support roller 64(D) is located on a transfer position TA side relative to the center 60T in the left-right direction in rearward view in the first and second exemplary embodiments, this is not restrictive. For example, the solid support roller 64(D) may be located on a side opposite to the transfer position TA side relative to the center 60T in the left-right direction in rearward view.

Although the solid support roller 64(D) is a driving roller that transmits driving force to the transfer belt 62 in the first and second exemplary embodiments, this is not restrictive. For example, a hollow support roller may be a driving roller.

Although the transfer cylinder 50 has the recessed part 54 on the outer circumferential surface thereof in the first and second exemplary embodiments, this is not restrictive. For example, the transfer cylinder 50 that does not have the recessed part 54 may be used. In this case, a front end portion of a recording medium P is held from both sides of the recording medium P by a holding part disposed at both ends of the transfer cylinder 50 in the axial direction. That is, a holding part that does not need to be stored in the recessed part 54 is used. Furthermore, the recessed part 54 provided on the outer circumferential surface of the transfer cylinder 50 may be a recessed part used for use other than storing the grippers 24, which are an example of a holding part.

Although the chains 22 are used as an example of a circulating member and the sprockets 25 are used as an example of a rotating member in the first and second exemplary embodiments, this is not restrictive. For example, a timing belt having recessed and raised parts on an inner circumference may be used as an example of a circulating member, and a timing pulley (i.e., a pulley having recessed and raised parts on an outer circumference) may be used as an example of a rotating member.

Furthermore, a belt may be used as an example of a circulating member, and a pulley that causes the belt to circulate due to friction may be used as an example of a rotating member.

Although the mass of the transport unit 16 is two times as large as the mass of the transfer unit 60 or larger in the first and second exemplary embodiments, this is not restrictive. For example, the mass of the transport unit 16 may be less than the mass that is two times as large as the mass of the transfer unit 60.

Although the mass of each of the ejection units 15A to 15F is 100 kg or larger in the first exemplary embodiment, this is not restrictive. For example, the mass of each of the ejection units 15A to 15F may be less than 100 kg.

Although the mass of each of the toner image forming units 222A to 222F is 100 kg or more in the second exemplary embodiment, this is not restrictive. For example, the mass of each of the toner image forming units 222A to 222F may be less than 100 kg.

Although the center of mass 60G is located closer to the toner image forming unit 222A among the toner image forming units 222A to 222F than to the toner image forming units 222B, 222C, 222D, 222E, and 222F in the second exemplary embodiment, this is not restrictive.

For example, the center of mass 60G need just be located closer to the toner image forming unit 222A among the toner image forming units 222A to 222F than to any one or more of the toner image forming units 222B, 222C, 222D, 222E, and 222F. Furthermore, for example, the center of mass 60G may be located closer to any of the toner image forming units 222B, 222C, 222D, 222E, and 222F than to the toner image forming unit 222A among the toner image forming units 222A to 222F.

The present disclosure is not limited to the above exemplary embodiments and can be modified, changed, or improved in various ways without departing from the spirit of the present disclosure. For example, the modifications described above may be combined as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
- a transfer cylinder that rotates;
- a rotating member that is coaxial with the transfer cylinder and rotates integrally with the transfer cylinder;
- a circulating member that is provided with a holding part that holds a front end portion of a recording medium, is suspended around the rotating member, and transports the recording medium by circulating as the rotating member rotates; and
- a transfer unit that has a transfer belt that sandwiches the recording medium transported by the circulating member at a nip position together with the transfer cylinder so that an image is transferred onto the recording medium, the nip position being located on one side relative to a center of the transfer unit in a horizontal direction when viewed from an axial direction of the rotating member, and a center of mass of the transfer unit being located on a nip position side relative to the center in the horizontal direction, wherein:
- a mass of a transport unit including the transfer cylinder, the rotating member, the holding part, and the circulating member is two times as large as a mass of the transfer unit or larger.

2. The image forming apparatus according to claim 1, wherein:
- the transfer unit has a cleaning part that cleans the transfer belt; and
- the cleaning part is located on the nip position side relative to the center in the horizontal direction when viewed from the axial direction of the rotating member.

3. The image forming apparatus according to claim 2, wherein:
- the transfer unit has a solid support roller that supports the transfer belt; and
- the support roller is located on the nip position side relative to the center in the horizontal direction when viewed from the axial direction of the rotating member.

4. The image forming apparatus according to claim 3, wherein:
- the support roller is a driving roller that transmits driving force to the transfer belt.

5. The image forming apparatus according to claim 3, further comprising a plurality of image forming parts that form images to be transferred from the transfer belt onto the recording medium,
- wherein the center of mass is located closer to an image forming part disposed on an immediately downstream side relative to the nip position in a circulation direction of the transfer belt than to image forming parts disposed on a downstream side relative to the image forming part in the circulation direction among the plurality of image forming parts.

6. The image forming apparatus according to claim 3, wherein:
- the transfer cylinder has a recessed part on an outer circumferential surface thereof; and
- the transfer unit has an opposed roller that is disposed so as to face the transfer cylinder and is pressed against the outer circumferential surface of the transfer cylinder with the transfer belt interposed therebetween.

7. The image forming apparatus according to claim 2, further comprising a plurality of image forming parts that form images to be transferred from the transfer belt onto the recording medium,
- wherein the center of mass is located closer to an image forming part disposed on an immediately downstream side relative to the nip position in a circulation direction of the transfer belt than to image forming parts disposed on a downstream side relative to the image forming part in the circulation direction among the plurality of image forming parts.

8. The image forming apparatus according to claim 2, wherein:
- the transfer cylinder has a recessed part on an outer circumferential surface thereof; and
- the transfer unit has an opposed roller that is disposed so as to face the transfer cylinder and is pressed against the outer circumferential surface of the transfer cylinder with the transfer belt interposed therebetween.

9. The image forming apparatus according to claim 1, wherein:
- the transfer unit has a solid support roller that supports the transfer belt; and
- the support roller is located on the nip position side relative to the center in the horizontal direction when viewed from the axial direction of the rotating member.

10. The image forming apparatus according to claim 9, wherein:
- the support roller is a driving roller that transmits driving force to the transfer belt.

11. The image forming apparatus according to claim 9, further comprising a plurality of image forming parts that form images to be transferred from the transfer belt onto the recording medium,
- wherein the center of mass is located closer to an image forming part disposed on an immediately downstream side relative to the nip position in a circulation direction of the transfer belt than to image forming parts disposed on a downstream side relative to the image forming part in the circulation direction among the plurality of image forming parts.

12. The image forming apparatus according to claim 9, wherein:
- the transfer cylinder has a recessed part on an outer circumferential surface thereof; and
- the transfer unit has an opposed roller that is disposed so as to face the transfer cylinder and is pressed against the outer circumferential surface of the transfer cylinder with the transfer belt interposed therebetween.

13. The image forming apparatus according to claim 1, further comprising a plurality of image forming parts that form images to be transferred from the transfer belt onto the recording medium,
- wherein the center of mass is located closer to an image forming part disposed on an immediately downstream side relative to the nip position in a circulation direction of the transfer belt than to image forming parts disposed on a downstream side relative to the image forming part in the circulation direction among the plurality of image forming parts.

14. The image forming apparatus according to claim 1, wherein:

the transfer cylinder has a recessed part on an outer circumferential surface thereof; and the transfer unit has an opposed roller that is disposed so as to face the transfer cylinder and is pressed against the outer circumferential surface of the transfer cylinder with the transfer belt interposed therebetween.

15. The image forming apparatus according to claim 14, wherein:

the recessed part is a recessed part in which the holding part is stored.

16. The image forming apparatus according to claim 1, further comprising an image forming part that forms an image to be transferred from the transfer belt onto the recording medium, wherein mass of the image forming part is 100 kg or larger.

17. An image forming apparatus comprising:

a transfer cylinder that rotates;

a rotating member that is coaxial with the transfer cylinder and rotates integrally with the transfer cylinder;

a circulating member that is provided with a holding part that holds a front end portion of a recording medium, is suspended around the rotating member, and transports the recording medium by circulating as the rotating member rotates; and a transfer unit that has a transfer belt that sandwiches the recording medium transported by the circulating member at a nip position together with the transfer cylinder so that an image is transferred onto the recording medium, a center of mass of the transfer unit being located on a nip position side relative to a geometric center of the transfer unit when viewed from an axial direction of the rotating member, wherein:

a mass of a transport unit including the transfer cylinder, the rotating member, the holding part, and the circulating member is two times as large as a mass of the transfer unit or larger.

18. The image forming apparatus according to claim 17, further comprising a plurality of image forming parts that form images to be transferred from the transfer belt onto the recording medium, wherein the center of mass is located closer to an image forming part disposed on an immediately downstream side relative to the nip position in a circulation direction of the transfer belt than to image forming parts disposed on a downstream side relative to the image forming part in the circulation direction among the plurality of image forming parts.

19. The image forming apparatus according to claim 17, wherein:

the transfer cylinder has a recessed part on an outer circumferential surface thereof; and the transfer unit has an opposed roller that is disposed so as to face the transfer cylinder and is pressed against the outer circumferential surface of the transfer cylinder with the transfer belt interposed therebetween.

* * * * *